United States Patent [19]

Butler et al.

[11] Patent Number: 4,982,835
[45] Date of Patent: Jan. 8, 1991

[54] MODULAR CONVEYOR CONSTRUCTION AND MOUNTING BRACKETS THEREFOR

[75] Inventors: James R. Butler, Ingleside; Roger L. Broederdorf, Crystal Lake, both of Ill.

[73] Assignee: Intepro, Inc., Ingleside, Ill.

[21] Appl. No.: 300,027

[22] Filed: Jan. 23, 1989

[51] Int. Cl.⁵ ............................................. B65G 15/00
[52] U.S. Cl. ............................ 198/836.3; 198/860.3
[58] Field of Search .................. 198/836, 860.3, 860.1

[56] References Cited

U.S. PATENT DOCUMENTS

| | | | |
|---|---|---|---|
| 3,313,400 | 4/1967 | Johnson | 198/836 |
| 3,739,904 | 6/1973 | Windstrup | 198/836 |
| 3,854,688 | 12/1974 | Shuford | 198/836 X |
| 3,874,497 | 4/1975 | Carlson | 198/836 |
| 4,204,595 | 5/1980 | Marrs | 198/836 |
| 4,674,626 | 6/1987 | Adcock | 198/836 X |

FOREIGN PATENT DOCUMENTS

| | | | |
|---|---|---|---|
| 3347796 | 1/1985 | Fed. Rep. of Germany | 198/860.1 |
| 140927 | 6/1987 | Japan | 198/860.3 |

Primary Examiner—Joseph J. Rolla
Assistant Examiner—Cheryl L. Gastineau
Attorney, Agent, or Firm—Charles F. Lind

[57] ABSTRACT

Brackets are provided that may be economically formed of only several pieces, and which pieces may be easily and mechanically assembled onto side framing of the conveyor system. Each bracket has a horizontal disposed piece and a vertically disposed piece which are arranged to lie adjacent and cross corresponding vertical and horizontal sides of the side framing, generally meeting across the lower corner and extending beyond the corresponding sides. Clamps cooperate with the brackets to form elongated slots, operable to allow the secure attachment of attachments or accessories usable with the conveyor system.

17 Claims, 3 Drawing Sheets

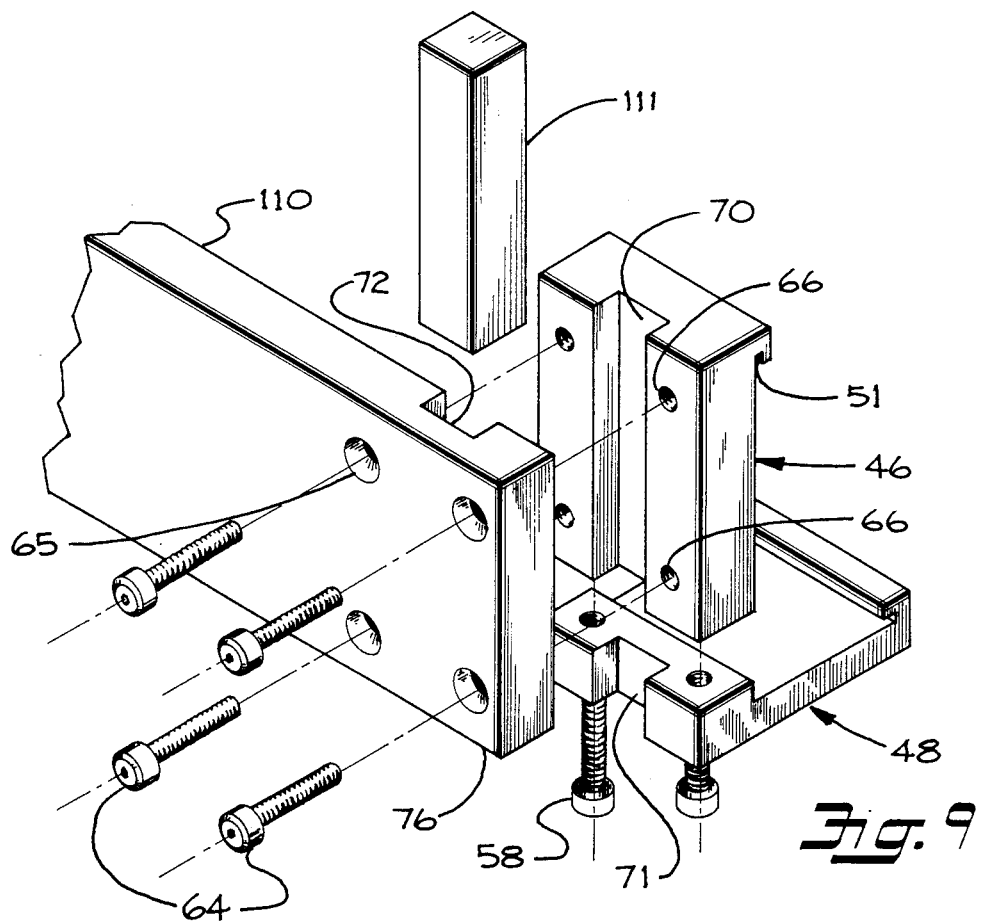
*Fig. 9*
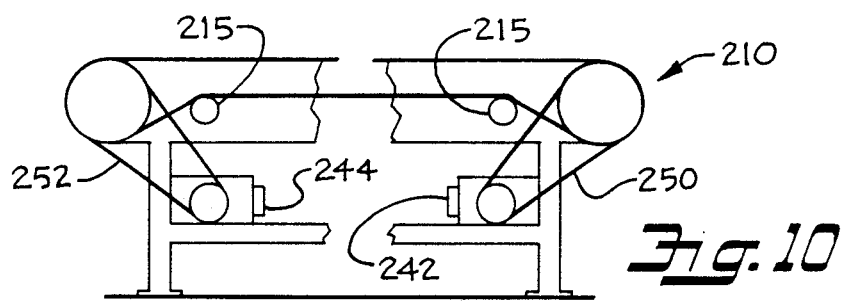
*Fig. 10*
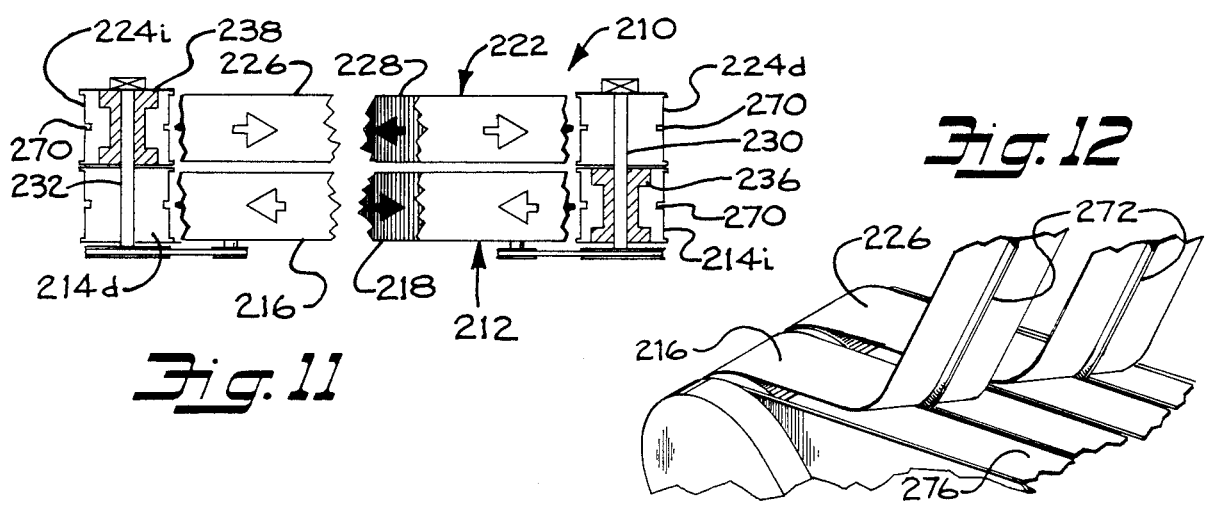
*Fig. 11*
*Fig. 12*

MODULAR CONVEYOR CONSTRUCTION AND MOUNTING BRACKETS THEREFOR

BACKGROUND OF THE INVENTION

Conveyor systems are used extensively throughout industry, to move physical components about easily and effortlessly during fabrication, assembly, delivery or the like, between two or more specific locations. As the layout, movement and other operative features of each conveyor system may demand unique characteristics, it has been quite common to engineer and design many conveyor system to suit the exact needs of a particular customer. This is very expensive; and possibly even inefficient, in that the construction of the system may not easily allow for subsequent in-the-field modifications to a different layout, operation or the like. Modular conveyor systems have also been designed and used, having conveyor components of standard size and configuration that may be selectively assemblied as desired to build up a conveyor system suited to satisfy the needed characteristics. However, even though the system components may be modular, it may be quite difficult to provide for in-the-field modifications, even minor in nature, to the conveyor system.

SUMMARY OF THE INVENTION

This invention provides improved modular conveyor components, that are designed to readily cooperate with one another or with adjacent conveyor components, to allow for the easy, quick and versatile design and assembly of a particular conveyor system, or for the subsequent in-the-field adjustment of a conveyor system, each to suit the desired needs or requirements of the system.

One object of the present invention is to provide brackets, that may be economically formed of only several pieces, and which pieces may be easily and mechanically assembled onto side framing of a conveyor system, at virtually any lengthwise position along the conveyor side framing, either as a new fabrication or as an in-the-field modification of a conveyor system; and further to provide clamp means that may cooperate with the brackets to form elongated slot means, operable to allow the secure attachment of an elongated post, key or the like for adjustably holding attachments or accessories usable with the conveyor system, including lane dividers, support legs, operational workstations, shelfs, tools, or structural mounting frames off of the conveyor system.

Another object of this invention is to provide modular conveyor system frame structures, of selected length adapted to be connected together end-to-end, and further each defining means to provide needed utilities at or adjacent the conveyor system, including isolated raceway means suited to enclose electrical components and/or pneumatic lines, and each having end connectors adapted to be respective connected with corresponding connectors of the adjacent conveyor system frame structure when the frame structures are connected together end-to-end.

Another object of this invention is to provide a conveyor system having separate side-by-side drive runs, suited to move in opposite directions, allowing for the simultaneous transfer of conveyed components in opposite directions.

BRIEF DESCRIPTION OF THE DRAWINGS

Further objects, advantages and features of the present invention will appear from the following disclosure and description, including as a part thereof the accompanying drawings, in which:

FIG. 9 is an exploded perspective view of an inventive mounting brackets cooperating with a frame member usable with the conveyor system;

FIG. 10 is an elevational view of an inventive dual direction conveyor system;

FIG. 11 is a plan view of the dual direction conveyor system of FIG. 10; and

FIG. 12 is a perspective view of the dual direction conveyor system of FIGS. 10 and 12, with part of the conveyor belt being pealed back and in an inoperative position to illustrate a feature of the construction.

DETAILED DESCRIPTION OF ILLUSTRATED EMBODIMENTS

Figure 1:
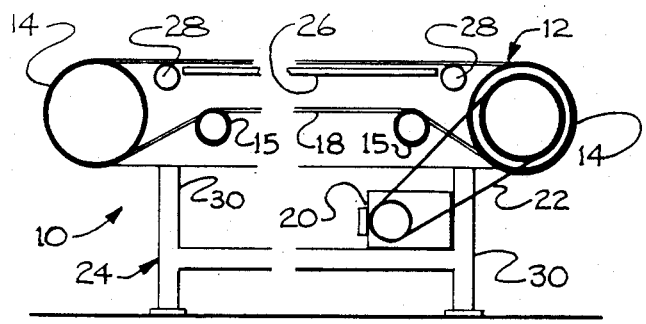
FIG. 1 is an elevational view of a typical conveyor system on which this invention may be used.

FIG. 1 shows a side elevational view of a conveyor system 10 having an endless loop drive 12 trained over end rollers 14 and idler rollers 15, to define an elongated upper drive run 16 and a lower return run 18. A motor 20 may rotate the one end roller 14, via an endless drive loop 22, to move the loop drive 12. The entire conveyor system may be supported by frame means 24, including slide plate means 26 and roll means 28 underlying the upper run 16, and legs 30 supporting the upper drive run 16 at the selected height above a floor or the like.

The conveyor system 10: (1) may be of a belt type, where the endless loop drive 12 is formed as a belt 32 (see FIGS. 2 and 3) of uniform width suited to have the articles (not shown) to be conveyed by the conveyor system carried on the belt; or (2) may be a roller or slide type (not shown) to support the articles to be conveyed by the conveyor system, and where the endless loop drive 12 is a chain or belt that operates pushers that engage and move the articles. The subject invention could be applicable with either type, although for simplicity sake, only a belt type conveyor will be illustrated herein when disclosing the invention.

For the most part, the conveyor system 10 as generalized operates only along a somewhat straight line or path; but nonetheless can be designed to have specific lengths and/or widths to extend between or past two or more locations. Moreover, with other conveyor systems (not shown), the overall layout can be designed to change directions or elevations, to have multiple flow paths, or to have many other known operative characteristic. However, the layout design forms no part of the subject invention.

Figure 3:
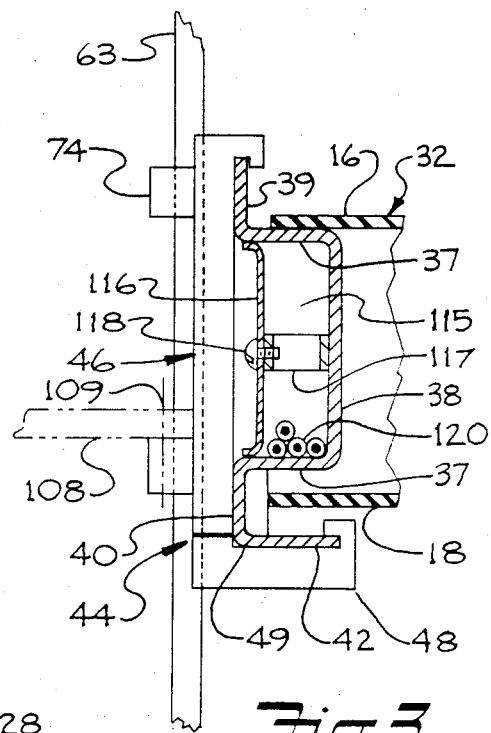
FIG. 3 is a fragmentary section, taken generally along line 3—3 in FIG. 2.
Figure 2:
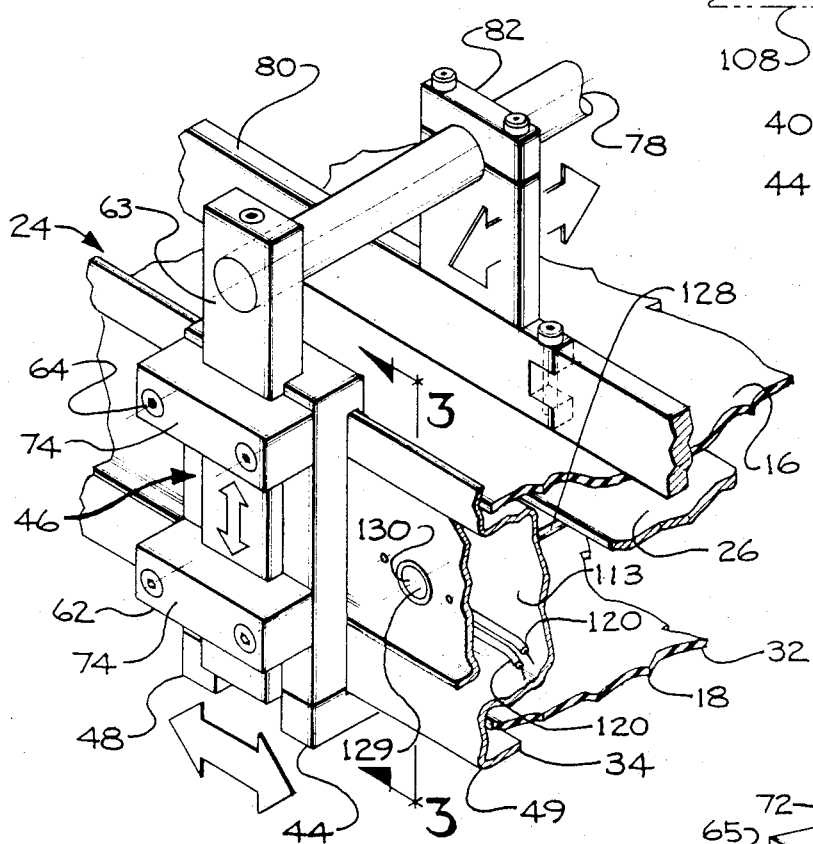
FIG. 2 is a perspective view of conveyor structure forming the invention, showing also an inventive mounting bracket connected in place thereto.
Figure 5:
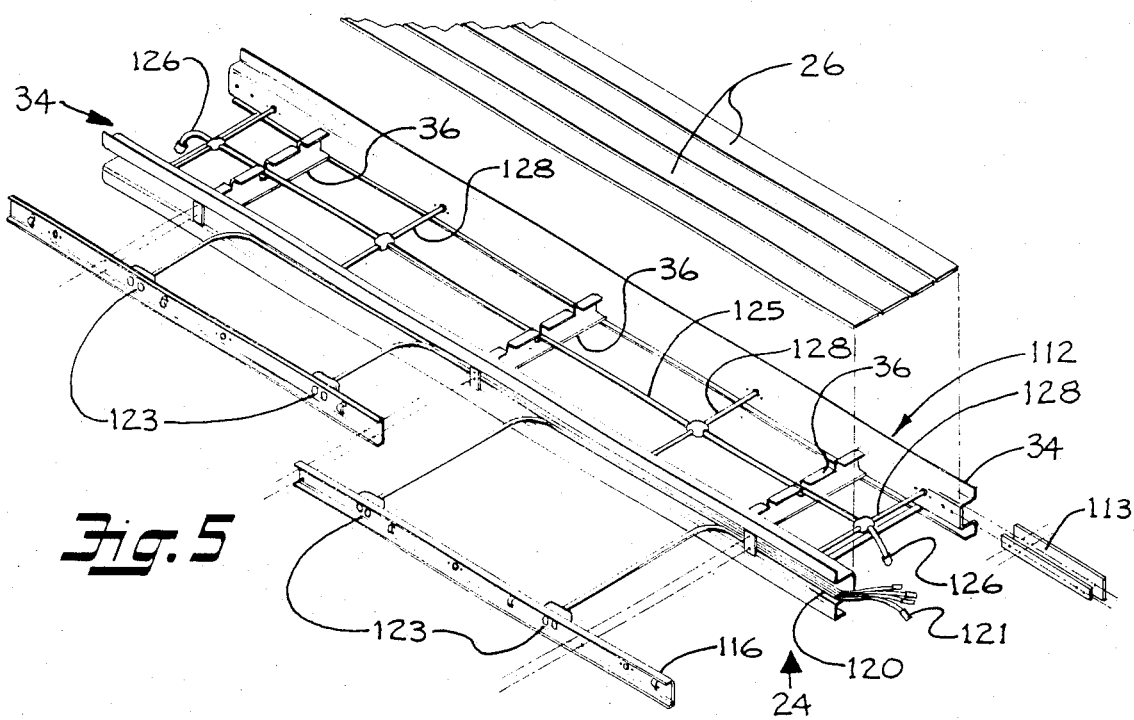
FIG. 5 is an exploded perspective view of additional conveyor structure forming the invention.

FIGS. 2, 3 and 5 illustrate details of the frame means 24, which can be seen to include spaced opposing side frame members 34 connected together at longitudinally spaced locations by cross members 36. The slide plate means 26 can be supported on the cross members 36, and can directly underlie and support the moving belt 32. Each side frame member 34 is of an irregular channel cross-section, including an intermediate C-shape defined by two wall 38, including vertical walls 39 and 40 connected off of the horizontal walls 37, and including a single lower horizontal wall 42 back-folded off of the lower end of the lower vertical wall 40. The belt 32 may have its upper run 16 in part ride along on the upper horizontal wall 37 of the side frame member 36, and may have its lower run 18 in part fit with clearance between the lower horizontal walls 37 and 42.

Figure 4:
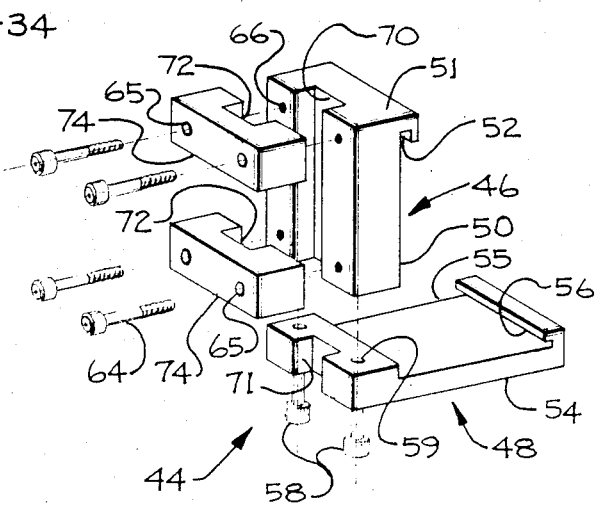
FIG. 4 is an exploded perspective view of the mounting bracket of the invention.

Bracket means 44 are adapted to be fixed mechanically to the side frame members 34, at selective but arbitrary locations along the length thereof, for yielding many different end purposes. The bracket means 44 illustrated in FIGS. 2-4 has two pieces 46 and 48 arranged to lie adjacent and cross corresponding vertical and horizontal sides of the frame member 34, generally meeting across the lower exterior corner 49 thereof and extended beyond the end edges of the corresponding frame wall 39 or 42. Each bracket piece 46 and 48 thus has a main body portion 50 and 54 sized to span the corresponding side of the frame member and a hooked end portion 51 and 55 formed laterally off the main portion defined to laterally overlie the end edge of the frame. An undercut in the lateral hooked potion 51 and 55 defines groove means 52 and 56 therein, open to the underlying end edge and suited to receive and trap the end edge.

The horizontal bracket piece 48 is actually sized to project beyond the vertical side of the frame member 34, to underlie and form a supporting shelf for the vertical bracket piece 46. Threaded means in the form of bolts 58 may be positioned through a hole 59 in the horizontal bracket piece 48 and threaded into a tap (not shown) in the vertical bracket piece 46, to separably connect the bracket pieces 46 and 48 together at the corner remote from the groove means.

The vertical bracket piece 46 is sized, so that when hooked onto the upper end edge of the side frame 34, via the lateral hook portion 51 and groove 52, and when snugged tightly down by the threaded means 58 against the shelf of the horizontal piece 48, provides that the bracket becomes frictionally secured to the conveyor side frame member. On the other hand, when the threaded means 58 are loosened, the frictional tightness is released to allow the bracket 44 to be slide lengthwise along the side frame member 34, to any desired location and tightened frictionally in place thereat.

Clamp means 62 are adapted to be connected to the vertical bracket piece 46, on the side thereof opposite from the lateral projection of the hook portion 51, to receive and support an elongated post 63. Threaded means in the form of bolts 64 may be positioned through holes 65 in the clamp means 62 and threaded into taps 66 in the exposed butted face of the bracket piece 46, to separably connect the clamp and bracket pieces together. When connected together, aligned cross-cuts or keyways 70, 71 and 72 respectively in the vertical bracket piece 46, the horizontal bracket piece 48, and the clamp means 62 define an elongated slot or opening means, that receives the post. In a perferred orientation, elongated slot or opening means is extended normal to the lateral hook portion 51 and groove 52.

The clamp means 62 are illustrated as two separate but similar C-shaped pieces 74 in FIGS. 2-4, 7 and 8; while only a larger single piece 76 could be used, as illustrated in FIG. 9. Four taps 66 are provided in each bracket piece 46, in two sets each of two holes aligned alone a plane generally parallel to the lateral hook portion 51 and specifically to the engaging face in the groove 52; and this symmetry allows for variable clamp piece arrangement. The defined elongated slot or opening means may be slightly smaller than the post 63, in the direction of the bolts 64, to allow the clamp means 62 to frictionally and nonmovably hold the post relative to the bracket 44.

The illustrated bracket-clamp arrangement 44,62 can be adapted for many varied uses, including for adjustably holding attachments or accessories usable with the conveyor system.

As is illustrated in FIG. 2, opposed pairs of such bracket-clamp means can be secured to the opposite side frame members 34, each holding a post 63 that together support a cross member 78 adapted then to span across the width of the conveyor. A lane divider vane 80 can be supported on the cross member, via a collar connection 82 can be set to any lateral location on the upper run 16 of the conveyor; and the vertical height of the vane 80 over the upper conveyor run 16 can be made by the vertical adjustment of the post 63 and by tightening the clamp means were desired.

Figure 7:
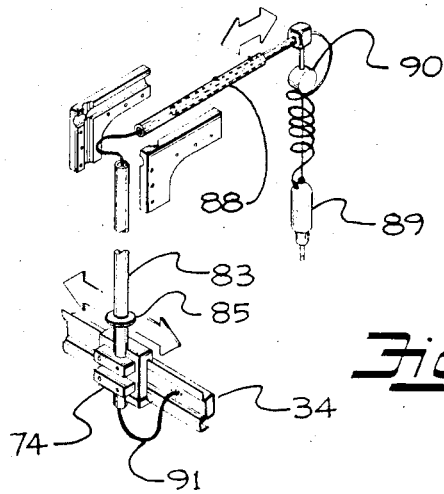
FIG. 7 is a perspective view of an inventive mounting bracket cooperating with an overhead accessory usable with the conveyor system.

FIG. 7 illustrated a single bracket-clamp means secured to one side frame members 34, holding a round post 83 loosely to allow post rotation. A collar 85 tightened on the post 83 sets the vertical height of an overlying arm 88, carried on the upper end of the post and adapted to swing out over the conveyor. The length of the arm can be adjustable. A tool 89 can be supported by the arm, by a retract mechanism 90 to allow tool use where needed, as is common. A pneumatic connection 91 for the tool 89 can be made to the conveyor, as will be disclosed more fully later.

Figure 8:
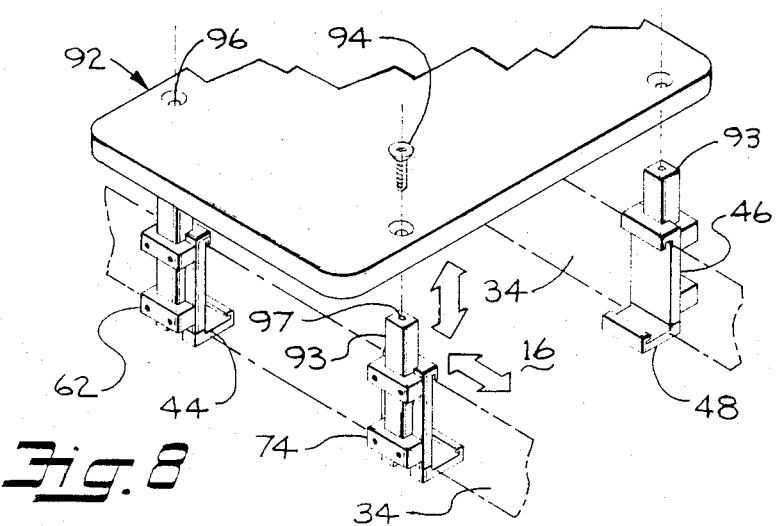
FIG. 8 is an exploded perspective view of inventive mounting brackets cooperating with an overhead workstation usable with the conveyor system.

FIG. 8 illustrates the use of the bracket-clamp means in supporting a workstation 92 over the upper conveyor run 16. Two sets of opposed pairs of such bracket-clamp means 44,62 can be secured to the opposite side frame members 34, each holding a post 93 that together support the workstation in the form of a rectangular plate, at any adjusted height over the conveyor or at any adjusted location along the length of the conveyor. Threaded means in the form of bolts 94 may be positioned through holes 96 in the plate and threaded into taps 97 in the exposed end of the post 93.

Figure 6:
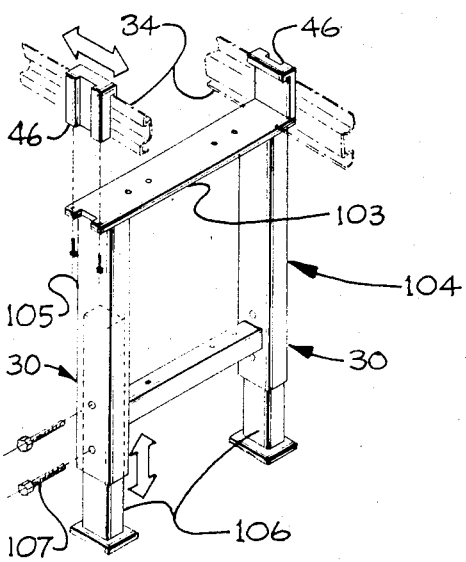
FIG. 6 is an exploded perspective view of inventive mounting brackets cooperating with support legs for the conveyor structure.

FIG. 6 illustrates the use of the bracket means in providing for the mechanical attachment of the support legs 30 to the conveyor. For this use and in a perferred embodiment, the previously disclosed horizontal bracket piece 48 will be eliminated, and in its place a cross member 103 will be used, spanning the width of the conveyor frame and projecting beyond the side frame members 34 to define the support shelves for supporting the vertical bracket pieces 46, one adjacent each side frame member. All size and location relationships between the vertical bracket piece 46 and cross member 103 can be similar to that disclosed with respect to the vertical bracket piece 46 and horizontal bracket piece 48; and the vertical bracket piece 46 can therefore be secured to the cross member 103 by the threaded means 58, as previously disclosed, to fix the vertical brackets to the side frame members 34 and cross member 103.

The real advantage of this bracket-leg combination is that the legs 30 can be secured to the conveyor, at virtually any location longitudinally along the length of the conveyor, at initial set-up of the conveyor or as may be later found after use and/or layout modifications to be needed. As will be appreciated, when the threaded means 58 are loosened, the entire leg assembly 104 of the two legs 30 and cross member 103 secured fixedly thereto can be slide lengthwise along the frame members 34 to the desired location; whereupon the threaded means 58 can be tightened to mechanically secure the legs 30 to the conveyor. The upper ends of the legs 30 can be welded to the cross member 103 or can be removably connected thereto by threaded bolt means or the like; and the legs 30 can have telescoping members 105 and 106 and cooperating lock means 107 therefor to allow for height adjustment of the conveyor.

One important aspect of the bracket-clamp means 44,62 disclosed herein is that as the vertical bracket piece 46, via the lateral projection 51, rests directly on the upper edge of the conveyor side frame member 34 and, via the shelf support, on the underlying horizontal cross member 103, great loads can be supported on the brackets 44 and transmitted directly to the underlying legs 30, without placing any load on the conveyor frame 34. This offers great utility and versatility for the workstation 92. Moreover, a shelf (108 as shown only in phantom in FIG. 3) may be rested on a clamp piece 74, and secured therto if desired by threaded means fitted throught the shelf and being threaded into the clamp piece alone the axis indicated at 109.

Another important aspect of the bracket-clamp means 44,62 disclosed herein is that it can be secured mechanically to the conveyor at virtually any longitudinal conveyor location, and without special prefabrication of the conveyor structure itself. On the other hand, in-the-field modifications can easily be made to conveyor constructions that do not have the appropriate vertical and horizontal walls 39 and 4 of the side frame member, such as by bolting or welding an angle-member to the conveyor frame, to define the properly located vertical and horizontal walls 39 and 42. Once this prefabrication has been made, the bracket-clamp means disclosed herein could be connected to the conveyor whereby any subsequent minor positional adjustments or the like would be readily possible.

Another important aspect of the bracket-clamp means 44,62 disclosed herein is that it can be used to define a structural extension of the conveyor side frame members 34, for example, off the end of the conveyor. The extension framing member is illustrated in FIG. 9, being simply an elongated member 110 having the appropriate configuratin of the clamp mamber 76 formed therein at one end as part of the unitary member. A key 111 can be inserted in the aligned keyway openings 70, 71 and 72 defined respectively by the vertical and horizontal bracket pieces 46 and 48 and by the elongated member-clamp 110,76, to provide for sound nonmovable mechanical connection of the pieces 46 and 110,76.

Paired cantilevered framing members 110 (only one being illustrated) secured to opposite side frame members 34 of the conveyor, can be adapted to support virtually any needed component of the conveyor system 10, for example to provide suitable support mountings (not shown) for the end rollers 14 of the conveyor illustrated in FIG. 1. The cantilevered support of the upper conveyor run at this location offers underlying open space, which may be desirable to accommodate one's feet for example should a work area or the like be provided on or over the upper conveyor run at this location.

Modular conveyor system frame structure is also disclosed as part of this invention, as illustrated in FIGS. 2, 3 and 5. As has been noted, spaced side frame members 34 are connected together by spaced cross members 36, to define a unitary frame assembly 112, which may be made of an appropriate width and length for easy handling and versatility of conveyor design. A conveyor system 10 would typically be made up of several similar or related unitary frame assemblies 112 connected together end-to-end, and connectors 113 are provided to overlap and secure the adjacent assemblies together.

Further as has been noted, the cross-section of each side frame member 34 is irregular, where the walls 37 and 38 define a raceway 115 open toward the side of the conveyor. A cover 116, sized to span across the space between the opposite walls 37, can be positioned against stops 117 from the frame wall 38 and secured by screws 118 in place thereagainst, to close the raceway 115. Electrical wires 120 can be positioned in the raceway 115, and can have at least one end exteded beyond the end of the frame member, with a connector 121 thereon. Thus, when connecting the adjacent assemblies together, the electrical wiring 120 can also be connected together with wires in the adjacent frame assembly by the cooperating connectors 121. Electrical outlets 123 may be mounted on the cover 116, at longitudinally spaced locations along the conveyor.

A pneumatic line 125 may likewise be run along the length of the frame assembly, having a flexible hose 126 with a coupling at each end, to allow easy connection of like lines of adjacent frame assemblies 112 to one another. Takeoff lines 128 from the main line 125 can be used to connect to fittings supported by the frame wall 38 and exposed via an opening 130 (see FIG. 2) in the cover 116 to allow for ready connection with a cooperating fitting. Thus, as noted earlier, the power tool 89 of FIG. 7 may readily be powered by this convenient air source.

Thus, the conveyor frame assemblies 112 and needed electrical and pneumatic utilities are self contained, with readily set end connectors to allow for easy set-up of the conveyor system, and with outlets 123 and fittings 129 conveniently located along the length of the conveyor. Virtually any conveyor system layout can be made by connecting together such frame assemblies 112, and without union-shop or skilled workers, for vastly lower installation costs.

FIGS. 10–12 illustrate a conveyor system 210 having two endless loop drives 212 and 222, each trained over end rollers 214d and 214i, and 224d and 224i, and idler rollers 215, to define two elongated upper drive runs 216 and 226 and two lower return run 218 and 228.

The end rollers 214i and 224d are supported on the same shaft 230, and end rollers 214d and 224i are supported on the same shaft 232. The end roller 214i is supported by a bearing unit 236 on the shaft 230 to rotate freely thereon, while end roller 224d is keyed the shaft 230 to rotate therewith. Likewise, the end roller 224i is supported by a bearing unit 238 on the shaft 232 to rotate freely thereon, while end roller 214d is keeyed the shaft 238 to rotate therewith. A pair of motors 242 and 244 are used: 242 to rotate the shaft 230 and roller 224d, via an endless drive loop 250, to move the loop drive 222; and 244 to rotate the shaft 232 and roller 214d, via an endless drive loop 252, to move the loop drive 212.

The conveyor system is set to move the separate upper drive runs 212 and 222 in opposite directions, although is side-by-side adjacent relation. This allows for the simultaneous transfer of conveyed articles in opposite directions, past or between two spaced locations. The particular utility of this arrangement is for returning the pallet trays (not shown) used to contain any article(s) that do not sit or ride properly on the conveyor run, without the pallet tray. This may be the situation in conveying any article that can cut, stain, drag against or otherwise damage the conveyor belt, and the article will thus be carried in the pallet tray.

To allow for proper drive and centerring of the belts on the end rollers, each roller face can have a circumferential V-groove 270, and a V-belt 272 can be bonded to the underside of each belt. The slide plate 276 is grooved at 278 to receive the belt with clearance.

While specific embodiments of the invention have been illustrated, it is apparent that variations may be made therefrom without departing from the invention concept. Accordingly, the invention is to be limited only by the scope of the following claims.

What is claimed as our invention is:

1. For use with a conveyor system having a side frame member and a longitudinally movable carrier disposed adjacent thereto, said side frame member having a vertical component and a horizontal component, the vertical component having a relatively thin longitudinally extended end edge, comprising the combination of bracket means for fixed attachment to the side frame member, at selective and arbitrary locations along the length thereof;

said bracket means having a horizontally disposed piece adapted to lie adjacent the horizontal component of the side frame member, and to project beyond the vertical component of the side frame member;

said bracket means also having a vertically disposed piece adapted to lie adjacent the vertical component of the side frame member, and to project beyond the said end edge of the vertical component of the side frame member;

said vertically disposed piece having a lateral end portion overlying the end edge of the side frame member and having means thereat suited to receive and trap the said end edge;

said vertically disposed piece extending to close proximity of the horizontally disposed piece;

means separably connecting the separate bracket means pieces together; and the vertically disposed piece being sized to provide that, when the separably connecting means is tight, the vertically disposed piece tightly entraps the said end edge of the conveyor side frame member, to frictionally secure the bracket means to the conveyor side frame member.

2. The combination of claim 1, further including the combination of separate clamp means, suited to define elongated openings with the bracket means; and means separably connecting the clamp means to the bracket means, and the openings being suited to receive an elongated member, and the clamp means being sized when tightly connected to the bracket means, to frictionally secure the elongated member relative to the bracket means, suited for holding attachments or accessories carried on the elongated member and usable with the conveyor system, in an adjustable position overlying the movable carrier of the conveyor system.

3. The combination of claim 2, further including the vertically disposed piece having threaded taps formed therein, suited to cooperatively receive bolt means, whereby such taps and bolt means serve as the means for separably connecting the clamp means to the bracket means.

4. The combination of claim 3, further wherein the vertically disposed piece is approximately L-shaped, having a relatively straight main body portion and said lateral end portion is formed laterally off of one end of the main body portion; and the main body portion having a keyway slot formed therein on the side thereof opposite the direction the lateral end portion projects laterally off of the main body portion, said keyway lying spaced from and between the threaded taps and serving in part to define the elongated opening means for receiving the elongated member.

5. The combination of claim 1, further including the conveyor system having a pair of laterally spaced side frame members with the longitudinally movable carrier being adjacently disposed therebetween; a second set of the bracket means, and such sets of bracket means being adapted to be fixed one each to the opposite side frame members at selective and arbitrary but generally opposite locations along the length thereof; and a cross member spanning the width of the conveyor system, and means associated with each set of the bracket means for connecting the bracket means and cross member together.

6. The combination of claim 5, further wherein said cross member and the separate horizontally disposed pieces are unitary and one and the same with one another.

7. The combination of claim 6, further including legs, and means for supporting the legs relative to the cross member, operable for supporting the conveyor system at selective and arbitrary locations along the length of the side members.

8. The combination of claim 1, further including an elongated member having a keyway slot formed therein; the vertically disposed piece having a keyway slot formed therein; and means for holding the elongated member and the vertically disposed piece together in a sound nonmovable connection, said holding means including a key cooperatively received and held in both of said keyway slots.

9. The combination of claim 1, further wherein the vertically disposed piece is approximately L-shaped, having a relatively straight main body portion and wherein said lateral end portion is formed laterally off of one end of the main body portion.

10. The combination of claim 9, further wherein the lateral end portion of the vertically disposed piece has an elongated groove formed therein, for serving as part of the means suited to receive and trap the end edge of the side frame member vertical component.

11. The combination of claim 10, further including the main body portion of the vertically disposed piece having a keyway slot formed therein on the side thereof opposite the direction the lateral end portion projects laterally off of the main body portion; and the vertically disposed piece also having threaded taps formed therein spaced from the keyway.

12. For use with a conveyor system having spaced side frame members and a longitudinally movable carrier disposed therebetween, and each side frame member having vertically and horizontally extended components meeting at a lower exterior corner, and the vertically and horizontally extended components respectively including relatively thin spaced longitudinally extended upper and inner end edges, comprising the combination of bracket means adapted for fixed mechanical attachment to the side frame members, at selective and arbitrary locations along the length thereof;

said bracket means having two pieces arranged to lie transverse to one another and to lie adjacent the corresponding vertically and horizontally extended components of each side frame member, said pieces respectively being extended beyond the corresponding end edge of the side frame member components, and said pieces respectively having a lateral end portion overlying the end edge of the side frame member component and having groove means suited to receive and trap the said end edge;

means separably connecting the separate pieces of the bracket means together at an intermediate corner remote from the groove means, and the pieces being sized, when tightly connected together, to tightly entrap the said end edges and frictionally secure the bracket means to the conveyor side frame members;

separate clamp means suited to define elongated openings with the brackets means; and means separably connecting the clamp means to the bracket means, and the openings being suited to receive an elongated member, and the clamp means being sized, when tightly connected to the bracket means, to frictionally secure the elongated member relative to the bracket means, suited for holding attachments usable with the conveyor system and overlying the movable carrier of the conveyor system.

13. The combination of claim 12, further including the combination of the spaced side frame members of the conveyor system having a cross-section including an intermediate C-shape of two horizontal walls and an interconnecting intermediate vertical wall and including vertical end walls connected off of the said horizontal walls, and a single lower horizontal wall back-folded off of the lower end of the lower vertical end wall, whereby the upper end of the upper vertical wall defines one of the longitudinally extended end edges and the inner end of the single lower horizontal wall defines the other of the longitudinally extended end edges.

14. For use with a conveyor system having spaced side frame members and a longitudinally movable carrier disposed therebetween, each side frame member having a vertical component and a horizontal component and the components respectively having relatively thin longitudinally extended end edges spaced from one another, comprising the combination of bracket means for fixed attachment to the side frame members, at selective and arbitrary locations along the length thereof;

said bracket means having a horizontally disposed piece adapted to lie adjacent the side frame member horizontal component and to extend beyond the side frame member vertical component;

said bracket means further having a vertically disposed piece adapted to lie adjacent the side frame member vertical component and to extend beyond the end edge thereof;

said vertically disposed piece having a lateral end portion overlying the end edge of the side frame member vertical component and having a groove suited to receive and trap the said end edge;

said vertically disposed piece extending away from the lateral end portion to be in close proximity of the horizontally disposed piece at a meeting corner remote from the lateral end portion;

means separably connecting the separate pieces of the bracket means together at said meeting corner, and the vertically disposed pieces being sized to tightly entrap the end edges of the side frame member vertical components, to frictionally secure the bracket means to the conveyor system;

separate clamp means to define elongated openings with the bracket means, the openings being suited to receive an elongated member, and the clamp means being sized to provide when tightly connected to the bracket means to frictionally secure the elongated member relative to the bracket.

15. For use with a conveyor system having a side frame member and longitudinally movable carrier disposed adjacent thereto, said side frame member having vertical and horizontal faces the improvement being bracket means adapted to be fixed to the side frame member at selective and arbitrary locations along the length thereof, comprising the combination of said bracket means having a separate horizontally disposed piece and a separate vertically disposed piece;

each respective bracket means piece having an elongated main body portion sized to span its corresponding horizontal and vertical face of the side frame member;

at least one bracket means piece having a hook portion at one end of the main body portion and disposed laterally thereof, and means on the hook portion sized to overlap and engage an exposed edge of the side frame member;

means to secure the main body portions together at the end of the one bracket means piece opposite the hook portion thereon, effective when tightened completely to cause the hook portion to entrap the exposed edge of the side frame and to frictionally secure the bracket means to the side frame member as positioned along the length thereof;

separate clamp means and means for separably connecting the clamp means to the bracket means so as to define elongated opening means; and an elongated member adapted to be received in said elongated opening means and be held by and between the clamp and bracket means in selective axial positions, said elongated member being directed transverse to the conveyor system and suited for holding attachments or accessories carried on and usable with the conveyor system, in selected adjustable positions relative to the movable carrier of the conveyor system.

16. The combination of claim 15, further including said one bracket means piece having a threaded taps formed therein, suited to cooperatively receive bolt means, whereby such taps and bolt means serve as the means for separably connecting the clamp means to the bracket means.

17. The combination of claim 16, further wherein said one bracket means piece is approximately L-shaped, with the main body portion being relatively straight and with the hook portion laterally projecting off one end thereof; and the main body portion having a keyway slot formed therein on the side thereof opposite the direction the hook portion projects laterally off of the main body portion, said keyway lying spaced from and between the threaded taps and serving in part to define the elongated opening means for receiving the elongated member.

* * * * *